United States Patent [19]

Doggett

[11] Patent Number: 4,731,542
[45] Date of Patent: Mar. 15, 1988

[54] SYSTEM AND METHOD FOR ACTIVATING AN OPERATING ELEMENT WITH RESPECT TO A MOVING SUBSTRATE

[75] Inventor: David E. Doggett, Sunnyvale, Calif.

[73] Assignee: Synergy Computer Graphics, Sunnyvale, Calif.

[21] Appl. No.: 906,258

[22] Filed: Sep. 11, 1986

[51] Int. Cl.⁴ .................................................. B65H 25/26
[52] U.S. Cl. ................................... 250/548; 250/561; 250/571; 356/429; 226/20; 242/571
[58] Field of Search ............... 250/557, 548, 559, 561, 250/571, 560; 356/429; 226/10, 20, 44, 45; 242/57.1

[56] References Cited

U.S. PATENT DOCUMENTS

| | | | |
|---|---|---|---|
| 4,485,982 | 12/1984 | St. John et al. | 250/557 |
| 4,569,584 | 2/1986 | St. John et al. | 355/14 R |
| 4,641,070 | 2/1987 | Pfizenmaier et al. | 250/548 |
| 4,641,198 | 2/1987 | Ohta et al. | 250/557 |

Primary Examiner—Edward P. Westin
Assistant Examiner—Charles F. Wieland
Attorney, Agent, or Firm—Limbach, Limbach & Sutton

[57] ABSTRACT

A system for activating an operating element with respect to a moving substrate comprises a tracking line formed on the substrate, the tracking line having an activation mark formed therein which reflects light of an intensity which is distinguishable from that reflected from the remainder of the tracking line. A photosensor is mounted in relation to the tracking line to sense the intensity of light reflected from the tracking line when the substrate is moving. The photosensor generates an output signal indicative of the passage of the activation mark with respect to the photosensor. The output signal is utilized to activate the operating element.

13 Claims, 23 Drawing Figures

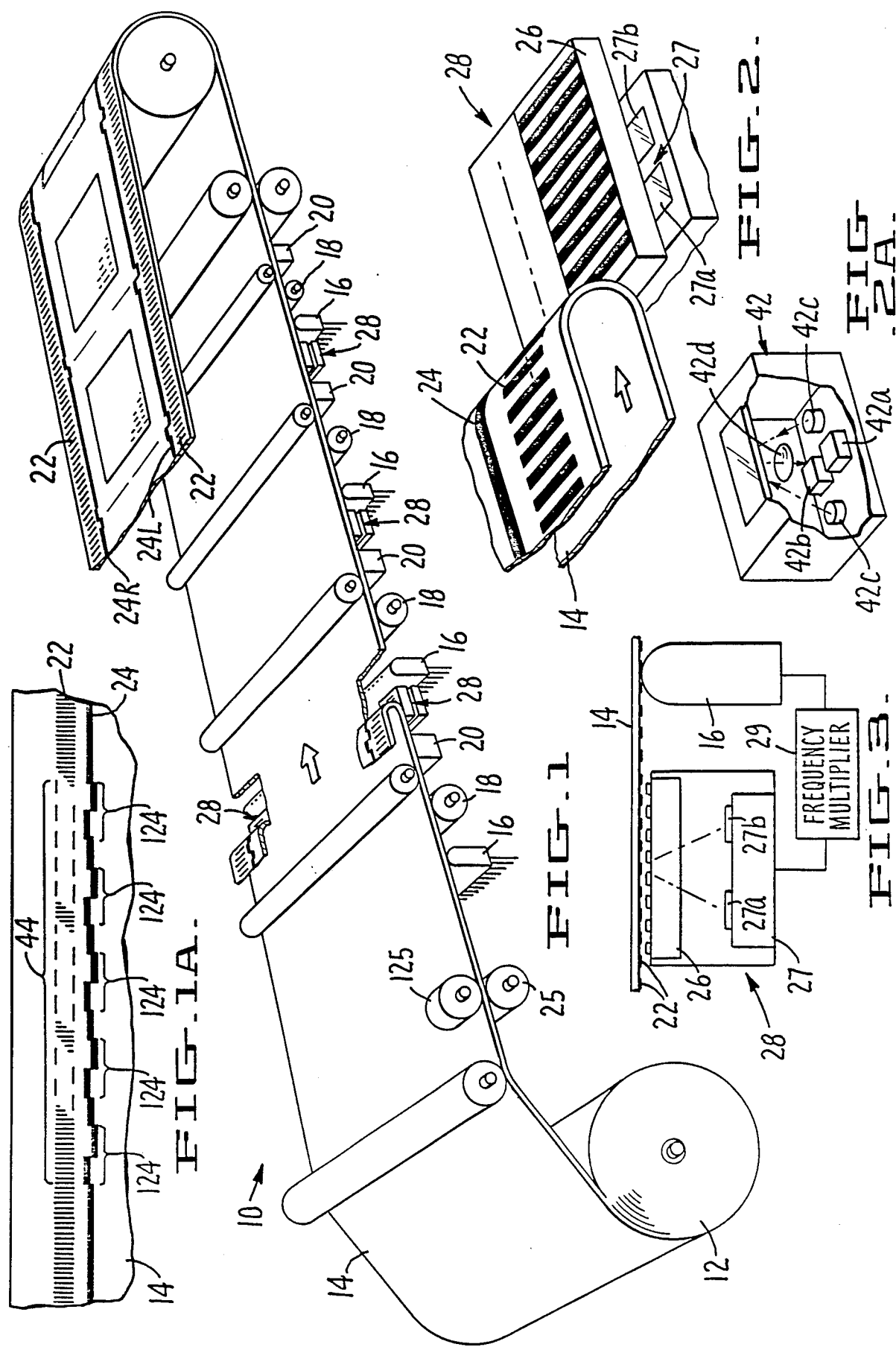

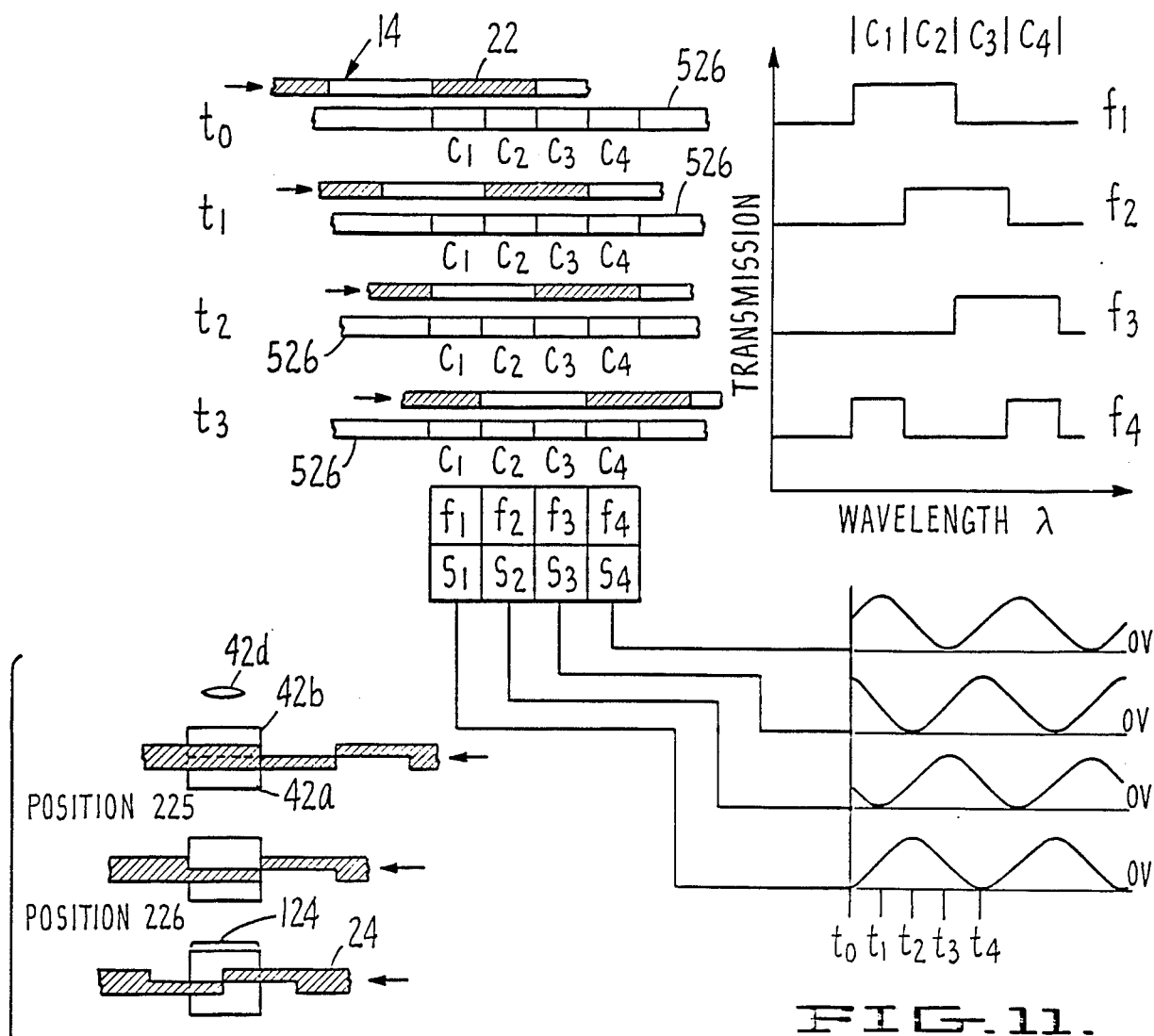
FIG. 11.
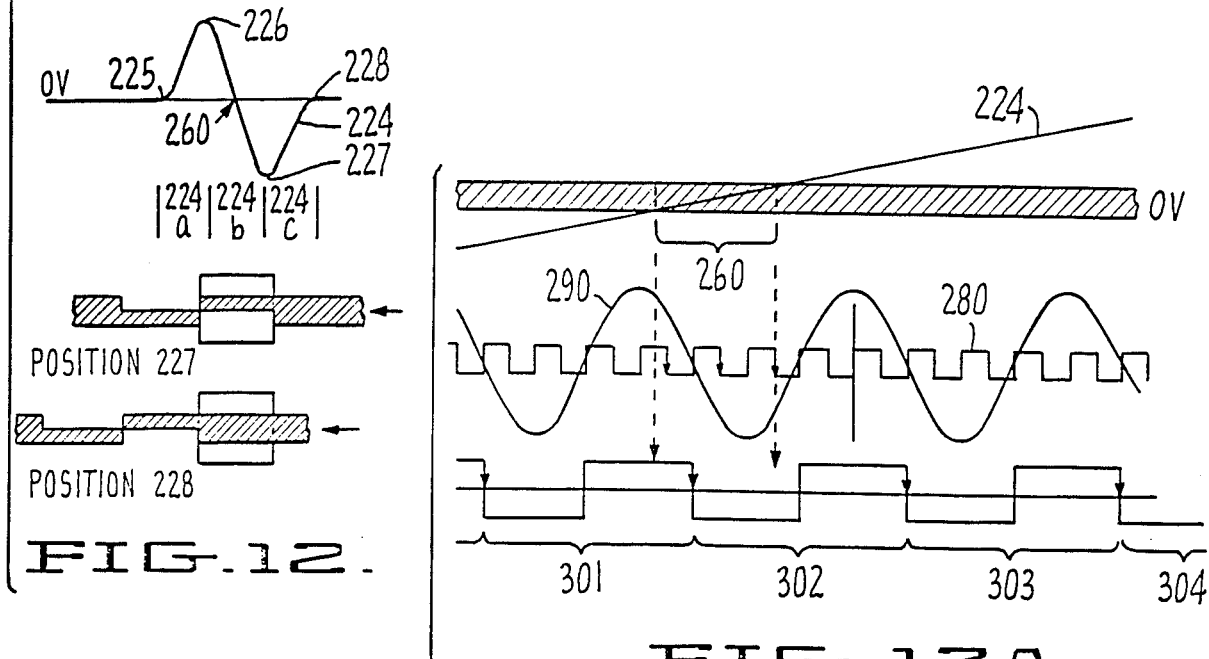
FIG. 12.
FIG. 12A.

FIG. 13A. TIMING REGISTRATION & SKEW SERVO

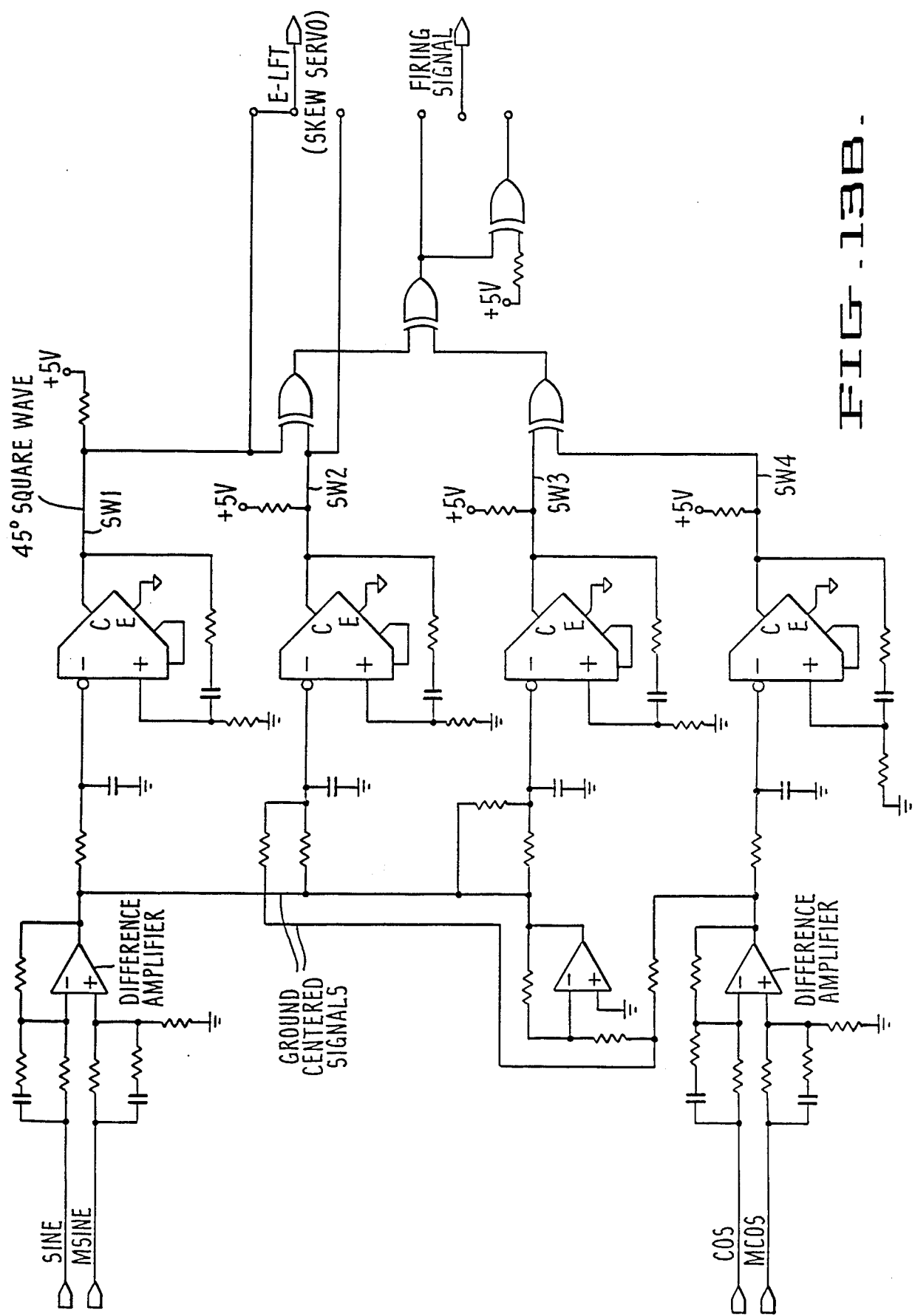

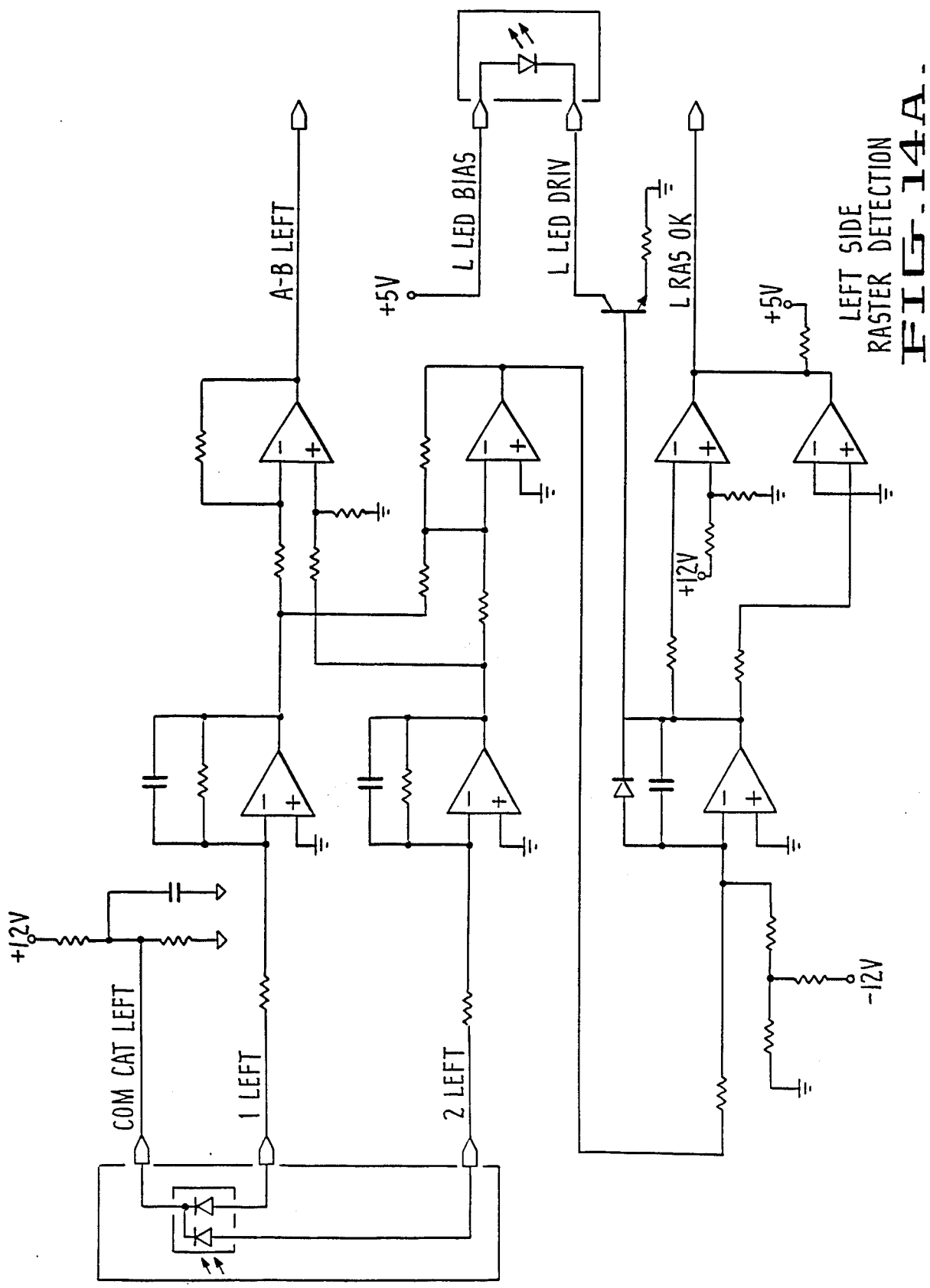
FIG. 14A. LEFT SIDE RASTER DETECTION

START OF PLOT
SAMPLE & HOLD

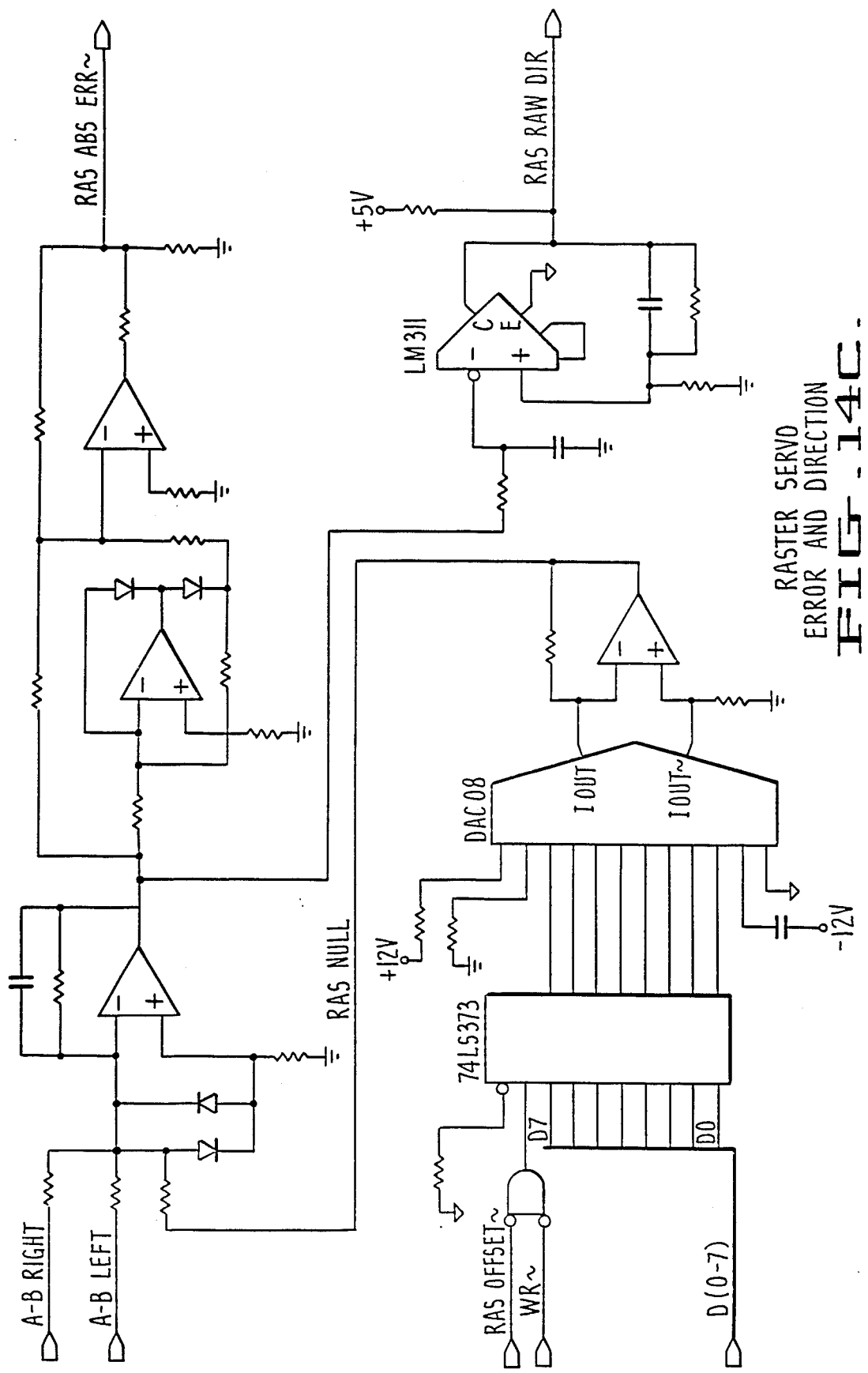
FIG. 14C. RASTER SERVO ERROR AND DIRECTION

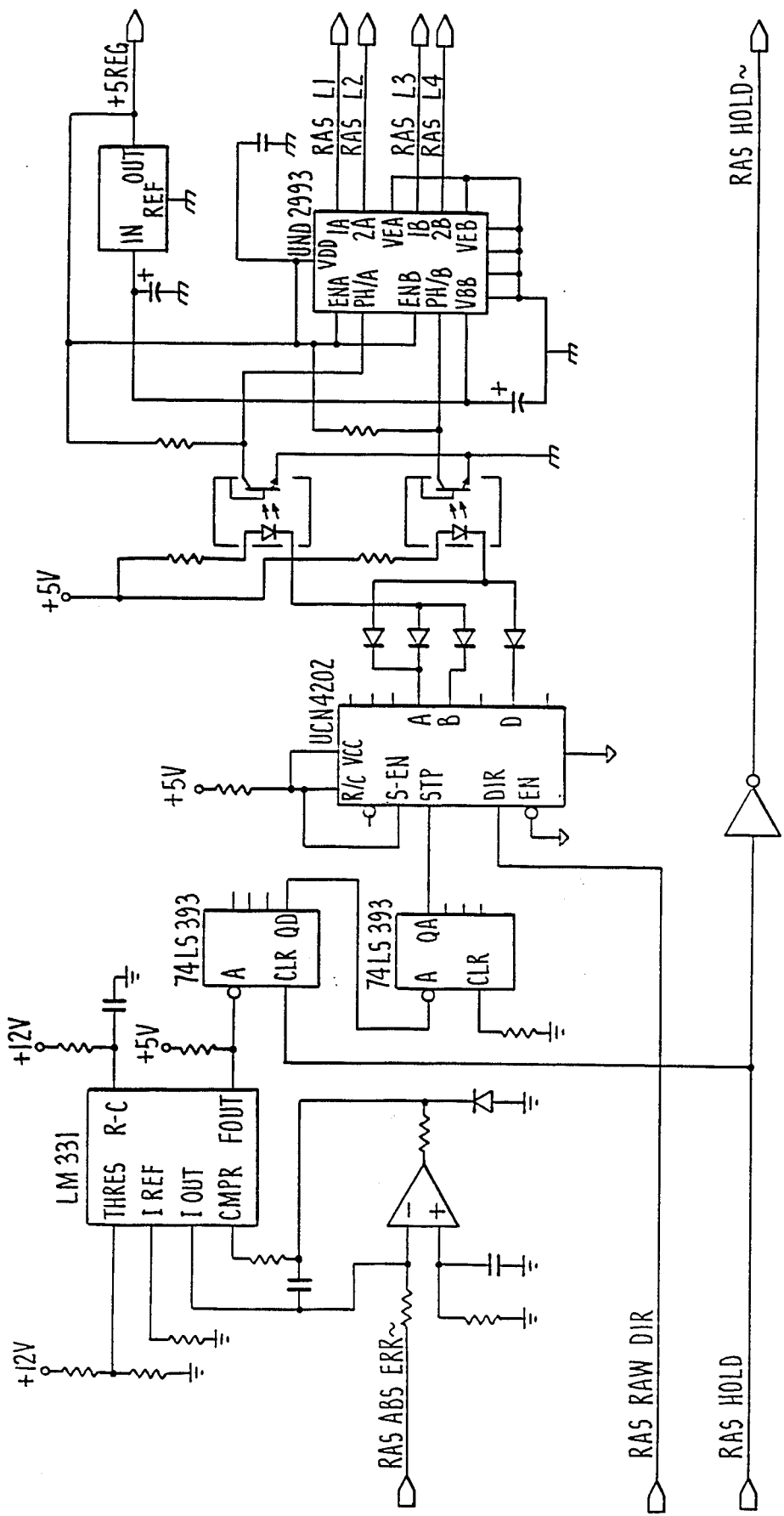

SYSTEM AND METHOD FOR ACTIVATING AN OPERATING ELEMENT WITH RESPECT TO A MOVING SUBSTRATE

RELATED APPLICATION

U.S. application Ser. No. 06/906,259 filed Sept. 11, 1986 and entitled REGISTRATION SYSTEM FOR A MOVING SUBSTRATE and assigned to the assignee herein.

BACKGROUND OF THE INVENTION

1. Technical Field

The present invention relates to printing systems and, in particular, to a system and method for initiating Start-of-Plot in a printing system such that an image is printed in accurate registration with previously printed images on a moving substrate.

2. Discussion of the Prior Art

Systems for controlling the relative positions of a moving substrate and an element or elements which operate on the moving substrate have been in use for some time. Control systems of this type typically use marks or indicia which are printed on the substrate material. These marks are scanned by a sensor as the substrate is fed past the operating element. When a mark passes the sensor in such a manner as to produce a signal indicative of an error in position between the mark and the operating element, the sensor, in conjunction with control circuitry, generates a correction signal and an adjustment is made.

U.S. Pat. No. 4,569,584, issued Feb. 11, 1986 to St. John et al., discloses a color electrographic recording device which produces a composite color image on a recording medium. The St. John printer transports the recording medium along a predetermined path. A print station in the transport path of the medium includes a recording head with an electrode which forms an electrostatic latent image on the medium. A number of developing stations in the transport path develop the latent image into a corresponding visible component image of a respective color.

The registration system disclosed in the St. John patent utilizes a series of solid, spaced-apart tracking marks which are printed on the print medium adjacent both of its edges. The tracking marks are printed such that a known, constant number of optical encoder pulses will be generated between adjacent marks. The tracking marks are observed electro-optically as the print medium moves through the device. The photosensors, in conjunction with appropriate electronics, are used to determine whether the number of pulses generated by the optical encoder, relating to the spacing between adjacent tracking marks, is the same or different from the expected constant value. Any differences between the observed value and the expected constant value are processed to form an error sample representative of the differences. A number of these error samples are then averaged to produce an error correction signal which corresponds to an average of the physical longitudinal shrinkage or expansion of the print medium that has occurred between the time the device printed the tracking marks and the later time that the marks are observed. The error correction signal is utilized to prevent image misalignment.

The St. John patent also teaches that the series of tracking marks used to maintain print image registration may be preceded by a series of initializing marks which is used to determine the point on the moving substrate at which printing of an image, or Start-of-Plot (SOP), will commence. This determination is made from the transition from the last initializing mark to the first tracking mark. When this transition is detected, the SOP point on the substrate can be determined. For example, as disclosed in the St. John patent, the initializing marks may be one-third the width of the tracking marks. For a photosensor detection cycle between the last narrower initializing mark and the first wider tracking mark, less encoder pulses will be detected than are detected for the normal cycle between adjacent tracking marks. This difference in the number of detected pulses is utilized to determine where on the substrate Start-of-Plot will begin.

The St. John patent also discloses a pair of solid, continuous tracking lines, one of which is formed near each edge of the print medium. These solid, continuous lines, in conjunction with appropriate photosensors and servo circuitry, are used for corrective lateral translation of the print medium.

SUMMARY

The present invention provides a system and method for initiating Start-of-Plot of a printed image on a moving substrate.

The system of the present invention comprises a tracking line formed on the substrate. An activation mark formed in the tracking line reflects light of an intensity which is distinguishable from that reflected from the remainder of the tracking line. A photosensor is mounted in relation to the tracking line to sense the intensity of light reflected from the tracking line when the substrate is moving. The photosensor generates an output signal indicative of the passage of the activation mark with respect to the photosensor. The output signal from the photosensor is utilized to activate the operating element.

Thus, it is an object of the present invention to provide for precise initiation of Start-of-Plot to effect accurate registration for a multi-color imaging system.

This and other objects and advantages of the present invention will become apparent and be appreciated by referring to the following detailed description of the invention considered in conjunction with the accompanying drawings.

DESCRIPTION OF THE DRAWINGS

FIG. 1 is a schematic drawing illustrating a perspective view of an electrostatic printer incorporating a comparison optical device registration system;

FIG. 1A is a schematic drawing illustrating a machine initialization pattern formed as part of a solid lateral tracking line for skew adjustment;

FIG. 2 is a schematic drawing illustrating a comparison optical device utilized together with printed timing marks and sensors for detecting substrate movement;

FIG. 2A is a schematic drawing illustrating a partially cut-away perspective view of a split detector for lateral registration of the substrate and for Start-of-Plot detection in accordance with the present invention;

FIG. 3 is a schematic block diagram illustrating the timing portion of the registration system;

FIG. 11 is a schematic drawing illustrating the generation of four waveforms utilizing the four-color comparison optical device shown in FIG. 10;

FIG. 12 is a schematic drawing illustrating the Start-of-Plot signal generated in accordance with the present invention by a split detector in response to the passage of the Start-of-Plot portion of the lateral tracking lines;

FIG. 12A is a schematic diagram illustrating the relationship between Start-of-Plot signal crossover and the write head firing signal in accordance with the present invention;

FIGS. 13A and 13B combine to form a schematic diagram illustrating a circuit utilized to generate a write head firing signal from the four waveforms generated by the four-section comparison optical device shown in FIG. 8;

FIGS. 13A, 13B and 13C combine to form a schematic diagram illustrating a circuit utilized to generate a skew correction signal from the output of two comparison optical devices according to the technique shown in FIG. 4;

FIGS. 14A, 14C and 14D combine to form a schematic diagram illustrating a circuit utilized to generate a lateral correction signal based on observation of the solid tracking lines; and FIGS. 14A and 14B combine to form a schematic diagram illustrating a circuit utilized to generate a Start-of-Plot signal from detection of the Start-of-Plot pattern formed as part of the tracking line in accordance with the present invention.

DETAILED DESCRIPTION OF A PREFERRED EMBODIMENT

Figure 4:
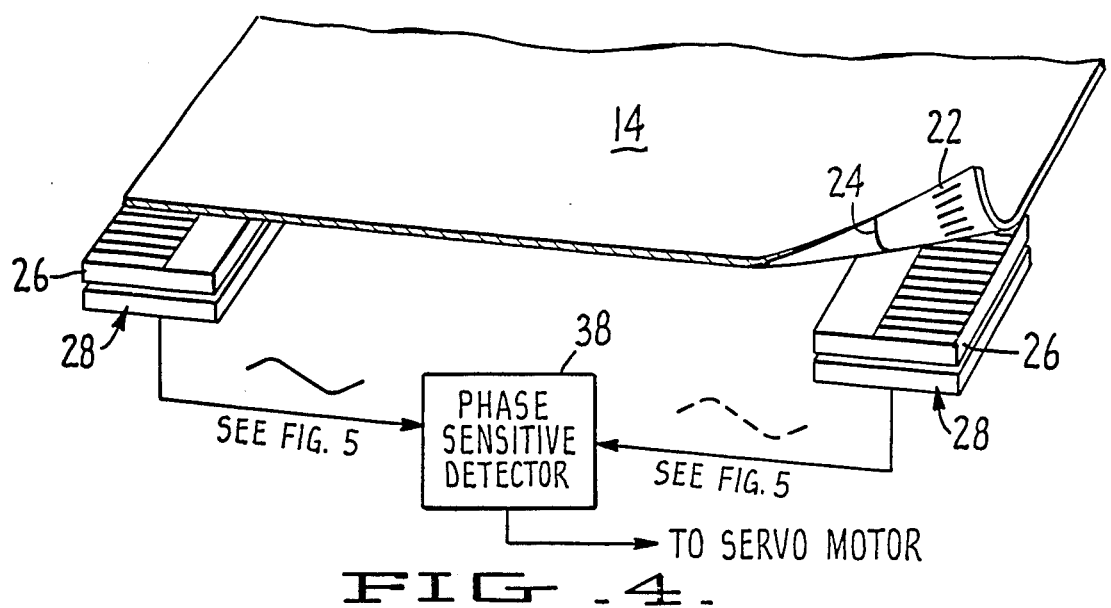
FIG. 4 is a schematic drawing illustrating a perspective view of the tracking line and sensors utilized for skew adjustment of the substrate.

Referring to FIG. 1, electrostatic printer 10 includes supply roller 12 which feeds print medium substrate 14 past a series of print stations.

In the embodiment illustrated in FIG. 1, electrostatic printer 10 includes four print stations, each including write head 16, toner roller 18 and drying/fixing station 20. In addition, each print station except the first includes a pair of sensor assemblies 28, which include comparison optical device 26, reflective sensor 27 and detector 42, for effecting print image registration.

Each write head 16 includes an array of conductive elements or wire stylii arranged in a linear configuration which is well known in the art. The stylii of each write head 16 (except the first, which responds to encoder 125) deposit charges on the surface of moving substrate 14 in a predetermined configuration according to instructions provided by an associated conventional computer system (not shown) and in response to a write head firing signal generated by the timing portion of the registration system, as described hereinbelow. The substrate 14 then moves past toner station 18 where it picks up charged ink particles which are fused to the substrate at drying/fixing station 20.

In the embodiment illustrated in FIG. 1, each print station prints a different primary color in registration with any colors printed by previous print stations.

As shown in FIGS. 1 and 1A, a series of equally spaced opaque timing marks 22 is printed by the first print station at each edge of substrate 14 on its print surface in response to signals from encoder 125. Encoder 125 produces a signal that is related to the movement of substrate 14. This signal is delivered to the electronics that controls the first write head 16 of printer 10 so that it may print timing marks 22 and other print data.

Timing marks 22 are printed on substrate 14 such that if timing marks 22 are printed to be one print line wide, then one print line is skipped between adjacent timing marks; if timing marks 22 are printed to be two print lines wide, then two print lines are skipped between adjacent timing marks 22; and so on. This spacing configuration is referred to as "one-on, one-off", or "two-on, two-off", as the case may be. In the preferred embodiment of the invention, timing marks 22 are printed in a one-on, three-off configuration with timing marks 22 on opposite edges of substrate 14 being in lateral correspondence. As described below, because the actual size of the printed dots is nominally 0.004" whereas the distance between four dots is 0.01", this configuration is effectively "two-on, two-off".

As will be explained in detail below, timing marks 22 are utilized to both provide a firing signal to write heads 16 and to detect changes in the skew of moving substrate 14.

As is best shown in FIGS. 2 and 3, the generation of a write head firing signal is accomplished through use of timing marks 22 on one edge of the substrate 14 in conjunction with comparison optical device 26.

In the preferred embodiment, comparison optical device 26 has matching opaque lines and spaces formed on the upper surface of a transparent substrate. Such a device is commonly known as a Ronchi Ruling. The spacing configuration of the lines and spaces of comparison optical device 26 corresponds substantially to the configuration of timing marks 22. In this case, there is a correspondence of "two-on, two-off", as modified by the print dot size (i.e., as stated above, the printed dot size is larger than the pitch of dot spacing and, therefore, the white space between the printed marks is narrower.) As shown in FIG. 1, in the preferred embodiment, one sensor assembly 28 is mounted upstream to all but the first write head 16 near each edge of substrate 14, in virtual contact with both substrate 14 and its associated write head 16, such that timing marks 22 pass in optical alignment with comparison optical device 26 when substrate 14 is moving through printer 10.

As shown in FIGS. 2 and 3, in the preferred embodiment, reflective sensor 27, such as a unit manufactured by TRW Corporation and having identifying number OPB706A, projects light from LED light source 27a onto substrate 14 through comparison optical device 26 and senses light reflected from substrate 14 through comparison optical device 26 at silicon phototransistor 27b. (It should be noted that while use of the LED light source just described is the preferred embodiment, it is possible, and within the scope of the present invention, to use other light sources to merely sense the ambient light contrast resulting from the passage of timing marks 22 with respect to comparison optical device 26.) When the opaque lines of comparison optical device 26 are in complete alignment with timing marks 22 on substrate 14, light is reflected from substrate 14 from the spaces between timing marks 22. In this position, the output signal from phototransistor 27b is at its maximum. Conversely, when the opaque lines of comparison optical device 26 are completely out-of-phase with timing marks 22, there is maximum absorption of light by the timing marks 22 of substrate 14 and the opaque lines of comparison optical device 26. In this position, the output signal from phototransistor 27b is at its minimum. Thus, the intensity of light reflected from substrate 14 varies from maximum reflection to minimum reflection in the time it takes for timing marks 22 to move from being completely in-phase with the opaque lines of comparison optical device 26 to being completely out-of-phase. Therefore, the frequency of the output signal generated by phototransistor 27b corresponds directly to movement of substrate 14 where the cycle corresponds to a distance equal to one timing mark cycle. Based on this correspondence, the output of phototransistor 27b may be used, in conjunction with appropriate circuitry as described below, to provide a firing signal to its associated write head 16 in direct correspondence to movement of substrate 14, and, therefore, the image printed thereon.

As stated above, in the described embodiment, timing marks 22 are printed in "one-on, three-off" configuration. This means that there are four print lines associated with each timing mark, one for timing mark 22 itself and three for the space following timing mark 22. Since, however, the print dot size is 4 mils diameter and print line pitch is 2.5 mils, the actual timing mark configuration is a series of 4 mil wide timing marks 22 separated by 6 mil wide spaces, effectively a "two-on, two-off" configuration. Based on this effective configuration, as shown in FIG. 3, the output signal of phototransistor 27b is provided to frequency multiplier circuitry 29 which increases the frequency of the phototransistor 27b output by a factor of four so that the firing signal provided to write head 16 activates write head 16 to print on a line-by-line basis.

Figure 6:
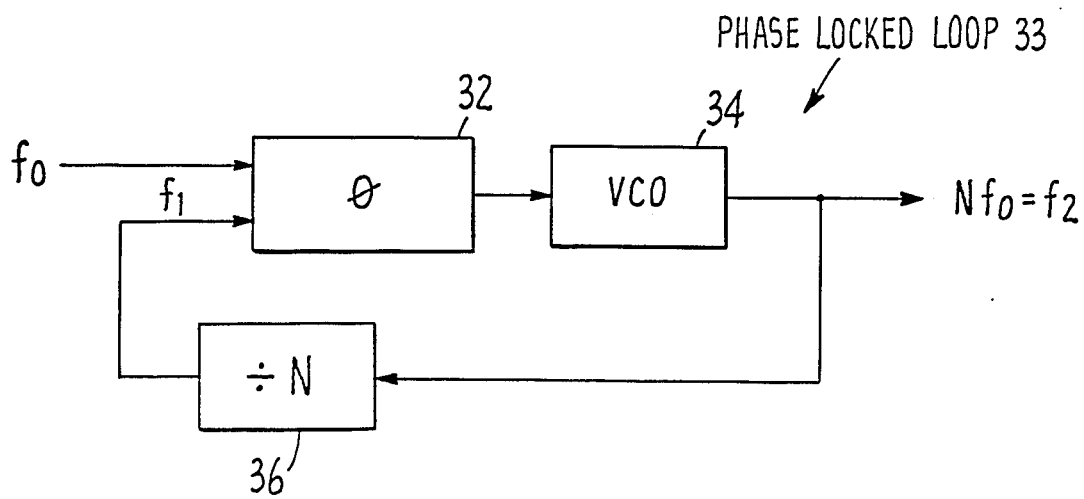
FIG. 6 is a schematic block diagram illustrating a phase locked loop used for adjusting the frequency of a write head firing signal.

FIG. 6 shows a conventional phase locked loop (PLL) 33 which provides the desired frequency multiplication. PLL 33 includes phase comparator 32, voltage controlled oscillator (VCO) 34 and frequency-divide circuit 36. PLL 33 drives frequency $f_1$ to be in phase with frequency $f_0$, the output signal from reflective sensor 27 in conjunction with comparison optical device 26 and timing marks 22. This is accomplished by driving VCO 34 to be N times frequency $f_0$. The frequency $f_2$ (where $f_2 = Nf_0$) of the signal generated by VCO 34 is modified by frequency-divide circuit 36 which outputs frequency $f_1$. This frequency $f_1$ is driven by phase comparator 32 to be in phase with frequency $f_0$. Thus, PLL 33 produces firing signal $f_2$ which is N times $f_0$ and in phase with $f_0$. As stated above, in this embodiment, N equals 4.

The use of a phase locked loop frequency adjustment, as described above, works well in the absence of electrical noise. However, if there are noise sources present, then a phase locked loop may have trouble tracking the signal from reflective sensor 27. Electrical noise can come from various sources. One potential source would be uneven substrate movement past the comparison optical device 26. Uneven substrate movement could have various causes. Slow changes in movement would result from the diameter of the substrate roll being out-of-round. Fast changes could come from gear tooth inaccuracies in the substrate drive motor, toner roller eccentricities or general machine vibrations. Whereas the PLL circuit described above can handle low frequency noise sources, it cannot respond adequately to high frequency noise such as the fast changes mentioned above. The result is that PLL 33 may go into error and, since output $f_2$ of PLL 33 is the firing signal that controls the printing of each line on substrate 14, print registration is compromised.

Two alternative methods of frequency multiplication may be used to produce the required write head firing signals. One alternative is to use a "one-on, one-off" timing mark configuration. The output signal frequency of reflective sensor 27 would then be one-half the print line clock rate, but each cycle would have two zero crossings which could be used to create a signal that activates write head 16 to print a line at the proper time.

Unfortunately, in the typical electrostatic printer of the type described above, the size of the stylii used and the resulting printed dot size cause an erosion of the unprinted space between the every-other-line of printed timing marks. For example, as described above, if the pitch of the line-to-line printing is 2.5 mils, then in a "one-on, one-off" configuration, the 2.5 mil space between timing marks 22 is reduced to about 1.0 mil because, while the centers of adjacent timing marks are 5.0 mils apart, the dots forming the marks are 4.0 mils in diameter. This situation significantly reduces the contrast ratio of the resulting comparison optical device 26 light signal and makes a "one-on, one-off" timing mark configuration less than desirable. A "one-on, one-off" configuration also makes initial skew adjustment more difficult.

It should be noted, however, that if special wires or even thin shim material, are placed in the first print station where timing marks 22 are produced, then a "one-on, one-off" configuration could be utilized with a resultant simplification of the system.

In the absence of the ability to use a "one-on, one-off" timing mark configuration, the next best configuration is the effective "two-on, two-off" configuration described above. However, as discussed above, the use of a "two-on, two-off" sequence requires production of a 4x frequency multiplication and, as discussed above, a PLL has problems in this application. However, an alternative technique for producing a 4x multiplication is through the use of "quadrature."

In quadrature, two signals are created that have a 90° phase relationship. As described below, through the use of these two signals, a 4x multiplication of the frequency of the output of reflective sensor 27 can be effected. This is a direct process that does not involve a PLL and, therefore, is not affected by moderate variations in the speed of substrate 14.

Figure 7:
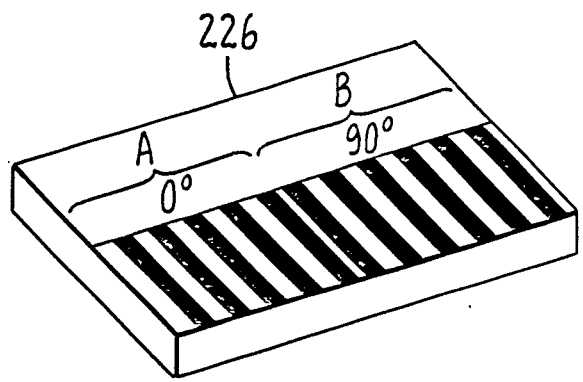
FIG. 7 is a schematic drawing illustrating a perspective view of a two-section comparison optical device utilized to produce quadrature.

To produce quadrature, a comparison optical device 226 having two distinct sections is substituted for the single-section comparison optical device 26 described above. As shown in FIG. 7, the two distinct comparison optical device sections A and B have exactly the same line spacing and line width as the previously-described comparison optical device 26 and, in fact, are identical gratings. The only difference in the gratings is their placement; they are placed in series so that their phase relationship is 90° with respect to each other. To accommodate the two distinct comparison optical device sections A and B, two reflective sensors, one for each section, are required to generate a dual output signal. The two output signals are provided to appropriate conventional circuitry, shown in FIG. 13B and described below, to produce the required frequency multiplication.

Figure 8:
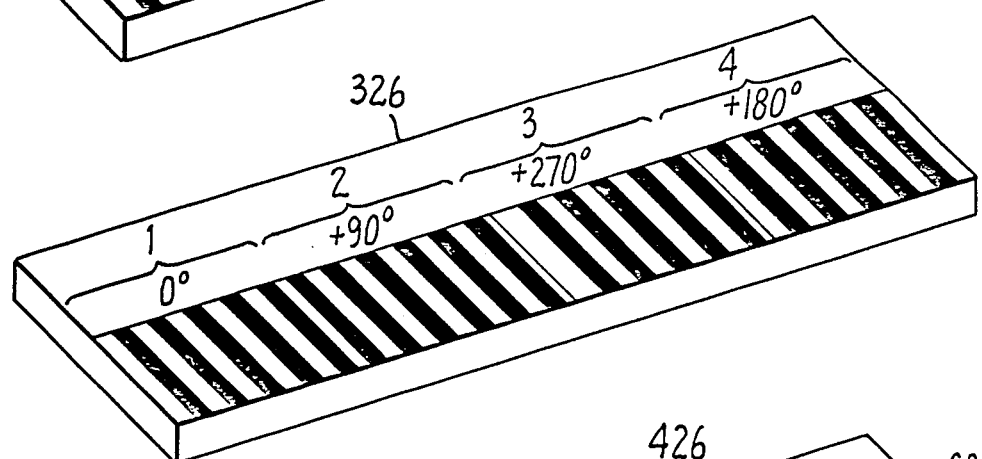
FIG. 8 is a schematic drawing illustrating a perspective view of a four-section comparison optical device utilized to produce four-signal quadrature.

A further improvement on the basic 2-signal quadrature resulting from the two-section comparison optical device arrangement described above in conjunction with FIG. 7, and the preferred embodiment, is 4-signal quadrature. Referring to FIG. 8, four separate output signals are generated by a comparison optical device 326 having four distinct sections 1-4 of the type described above and positioned with respect to each other so that their sequential phase relationship is 0°, 90°, 270° and 180°, respectively. The four resulting signals represent sine, cosine, −cosine and −sine. These four signals are used in conjunction with appropriate conventional circuitry to generate the required frequency multiplication so as to produce a write head firing signal that is independent of substrate background "whiteness."

The four distinct comparison optical device sections 1-4 shown schematically in FIG. 8 have the same line width and line spacing, but, as stated above, each section is phase shifted with respect to the others. The sections 1-4 can be described in terms of phase angle where 360° is the distance from the side of one line in a section to the same side of an adjacent line in the same section. Thus, section 1 is 0° (sine), section 2 is +90° (cosine), section 3 is +270° (−cosine) and section 4 is +180° (−sine).

Each of the four sections 1-4 shown in FIG. 8 has an individual LED/phototransistor pair associated with it.

Figure 8A:
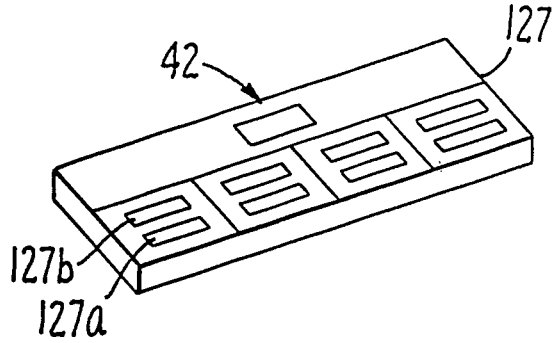
FIG. 8A is a schematic drawing illustrating a perspective view of a sensing block utilized in conjunction with the four-section comparison optical device shown in FIG. 8.

According to a preferred embodiment, rather than the LED/phototransistor pair being arranged sequentially as shown in FIGS. 2 and 3, LED 127a and phototransistor 127b are mounted in a side-by-side configuration as shown in FIG. 8A. This side-by-side configuration substantially eliminates any "shadow" effect caused by deeply etched lines in the comparison optical device. LED 127a and phototransistor 127b can be purchased and mounted separately. LED 127a in the FIG. 8 embodiment is a TRW GaAlAs LED, Part No. OP268FA; phototransistor 127b is also a TRW product, Part No. OP508FA. LED 127a and phototransistor 127b are shielded by a piece of copper 127 which is grounded because of the proximity of these components to the write head 16.

Thus, four output signals, representing sine, cosine, −cosine and −sine. are generated by the four-section comparison optical device 326. These four signals are provided to appropriate circuitry which generates a single firing signal for write head 16. An example of a circuit which can be used to generate the firing signal is provided by the combination of the circuitry shown in FIGS. 13A and 13B.

FIG. 13A shows circuitry for generating a sine output signal SINE from the signal generated by the first phototransistor 127b of the four-section comparison optical device 326. Identical circuitry is utilized to generate similar signals corresponding to the other three comparison optical device sections, i.e., cos, −cos and −sine. These four signals (SINE, MSINE, COS AND MCOS) are then provided to circuity as shown in FIG. 13B. As shown in FIG. 13B, the SINE and MSINE signals are provided to the "plus" and "minus" inputs of a difference amplifier. The COS and MCOS signals are similarly processed. The two resulting ground centered signals are then split and squared-up to form four 45° square wave signals SW1-SW4 which are delivered as inputs to an exclusive-OR tree. The exclusive-OR changes state with each transition of one of the four comparison optical device signals, thereby providing four write head FIRING SIGNAL outputs with the passage of each timing mark 22.

By utilizing circuitry of the type just described, any DC offset in the signal from the four-section comparison optical device 326 is cancelled. A DC offset is always present since the opaque lines of the comparison optical device and opaque timing marks 22 are not completely absorbing and there is generally some scattered light present.

The aforedescribed method of using signals representing sine and −sine and cosine and −cosine can be used to partially cancel mottling of the substrate reflectivity. Since there are four comparison optical device sections and four separate reflective sensor pairs, the effect is limited mottling artifacts of size comparable to the distance between sine and −sine and cosine and −cosine detectors.

Figure 9:
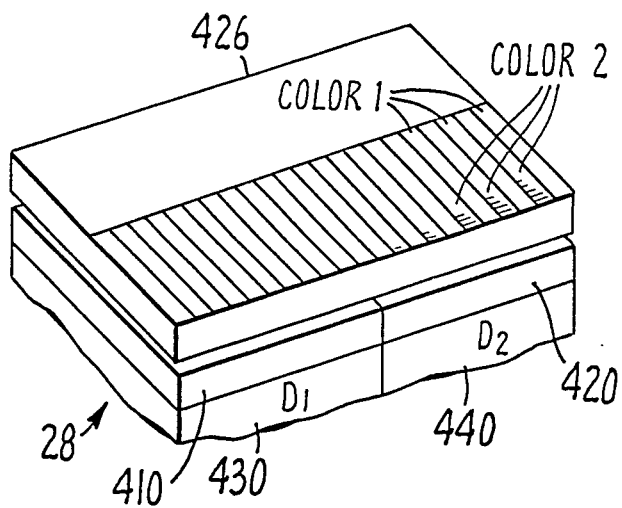
FIG. 9 is a schematic drawing illustrating a perspective view of a two-color comparison optical device and its associated sensing assembly.

A further improvement over use of a 4-signal quadrature comparison optical device uses a single comparison optical device where the distance between elements which produce the sine and cosine signals effectively disappears. In accordance with this concept, FIG. 9 shows a comparison optical device 426 wherein instead of having alternate clear and opaque (black) stripes, alternating stripes of different colors are provided. Thus, both the sine and the cosine signals are generated from the same comparison optical device grating. If timing marks 22 are black, then as they move over each color on comparison optical device 426, the black timing marks 22 back up first one color and then the other. When the black timing marks back up one color, color is removed, since the light that passes through that color is not reflected. Therefore, as substrate 14 is moved, the black timing marks 22 on substrate 14 cause the reflected light that passes through colored comparison optical device 426 to change from color 1 to color 2 and then back again. Two reflective sensors 430 and 440 are positioned so that they collect the scattered light that reflects from substrate 14 through two-color comparison optical device 426. Sensor 430 has a color filter 410 for color 1 and sensor 440 has a colored filter 420 for color 2. Thus, each sensor generates a waveform which is 90° out of phase with the other sensor's waveform. This arrangement generates sine and cosine. The advantage of this technique is that the two signals come from the same location on the substrate and, thus, see the same substrate reflectivity characteristics. When the two signals are combined, any variations in the DC level of one signal will be the same in the other signal and, therefore, the effects of substrate 14 mottling will diminish.

Figure 10:
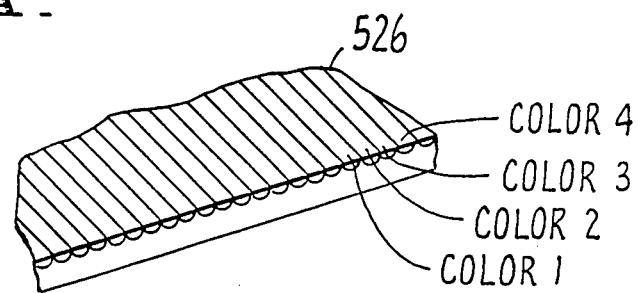
FIG. 10 is a schematic drawing illustrating a perspective view of a four-color comparison optical device utilized to produce four-signal quadrature.

The above-described "two-color" comparison optical device concept can be extended to quadrature as well. As shown in FIG. 10, for quadrature, four stripes of different colors, with a spacing of one-half the spacing of timing marks 22, are used in a single comparison optical device 526.

Referring to FIG. 11, in a manner similar to the two-color comparison optical device 426, four reflective sensors $f_1-f_4$ of the type described above are positioned so that each senses the light that reflects from substrate 14 through the four-color comparison optical device 526. Sensor $s_1$ includes a color filter $f_1$ which passes two colors, C1 and C2; sensor $s_2$ includes a color filter $f_2$ which passes colors C2 and C3; sensor $s_3$ has a filter $f_3$ which passes colors C3 and C4; and sensor $s_4$ has a filter $f_4$ which passes colors C4 and C1. As substrate 14 moves over four-color comparison optical device 526, black timing marks 22 will back up different colors, resulting in 90° phased output signals from the four sensors $s_1-s_4$. As stated above, each of the color stripes C1-C4 are one-half the width of the respective black timing marks 22.

For example, as shown in FIG. 11, at time $t_0$, black timing mark 22 backs up the color C1 and C2 comparison optical device stripes. Therefore, at time $t_0$, sensor $s_1$ senses low intensity reflection since substantially all light passing through the comparison optical device behind those two stripes is absorbed by timing mark 22. Similarly, at time $t_0$, sensor $s_2$ senses medium intensity light since low light is reflected through the color C2 stripe but high light is reflected through the color C3 stripe, which is backed by a "space"; sensor $s_3$ senses high intensity light because both the color C3 stripe and the color C4 stripe are backed by a "space"; and sensor $s_4$ senses medium intensity light because the color C4 stripe is backed by a "space" and the color C1 stripe is backed by a timing mark.

As the substrate 14 moves from time $t_0$ through time $t_x$, the detectors sensors $s_1-s_4$ generate the 90° phased signals shown in FIG. 11. These waveforms can be used to generate a write head firing signal in the same manner as the signals derived from the four-section comparison optical device described above with respect to FIG. 8. The advantage of this four-color technique is that the firing signal can be derived from a single point on substrate 14.

Figure 5:
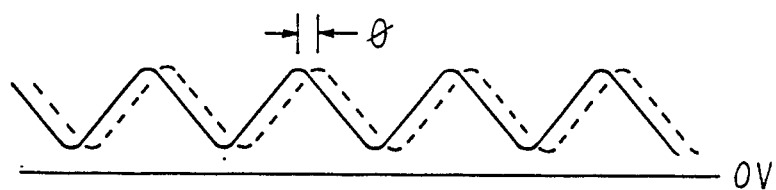
FIG. 5 is a schematic diagram illustrating two signals generated by a pair of associated comparison optical devices for skew adjustment of the substrate, in the presence of skew, in accordance with the method illustrated in FIG. 4.

Referring back to FIGS. 4 and 5, the adjustment for skew in moving substrate 14 is based upon the signals generated by the two sensor assemblies 28 associated with each print station. The output of reflective sensor 27 associated with each assembly 28 is processed by circuitry, described below, and provided to a conventional phase sensitive detector 38. Phase sensitive detector 38 generates an error signal which is based on the phase difference $\phi$ between the left and right sensor 27 outputs. The error signal drives a servo motor (not shown) which angulates the associated write head 16, to which sensor assemblies 28 are attached, to remove the skew error. Alternatively, the error signal could be used to steer substrate 14.

Figure 13C:
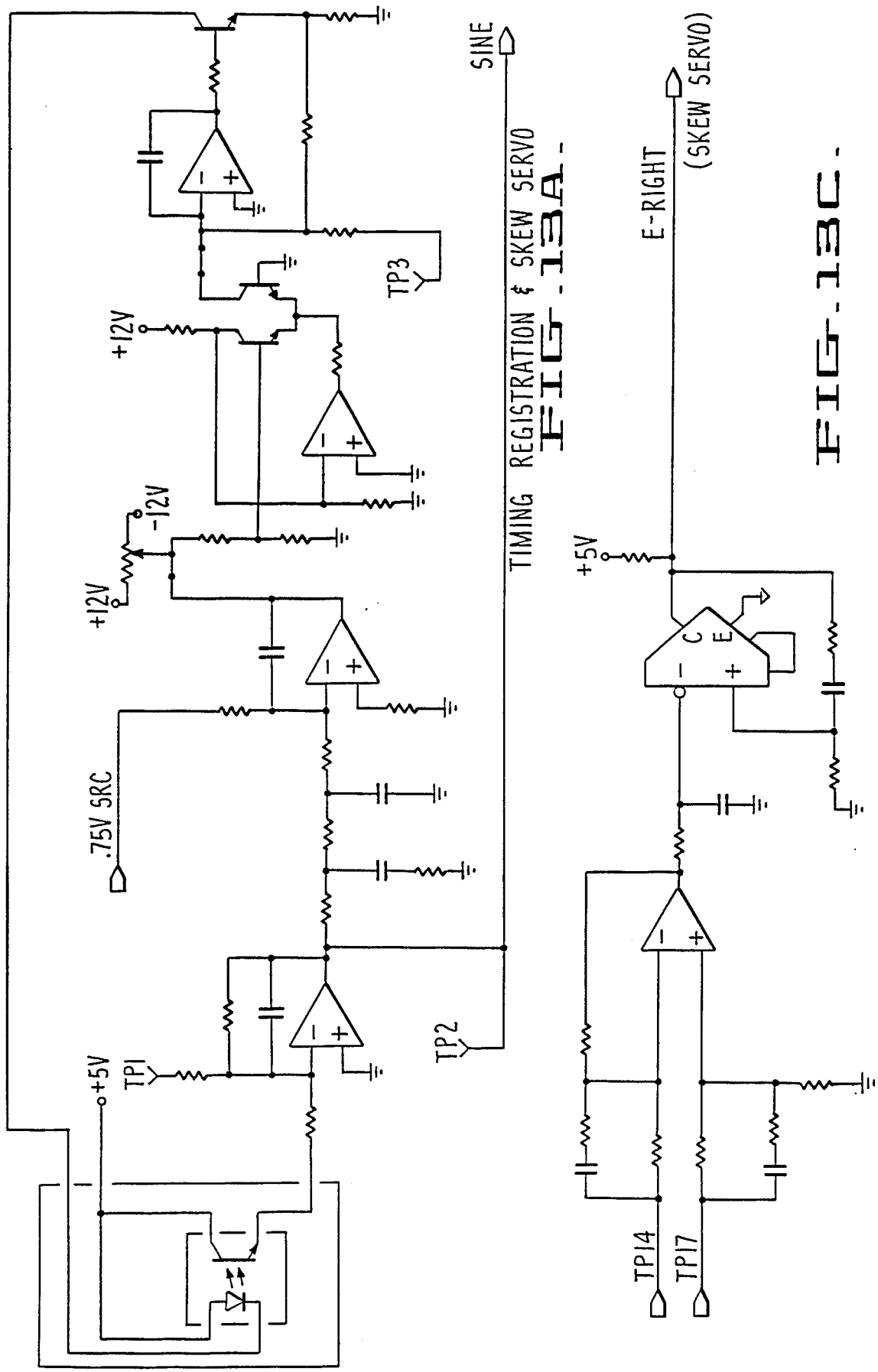

The circuitry for phase sensitive detector 38 is shown in the combination of FIGS. 13A-13C. As described above, the circuitry shown in FIGS. 13A and 13B generates four 45° square wave signals. As shown in FIG. 13B, one of these signals, designated E-LEFT, is used as the skew servo signal from the comparison optical device located at one side of substrate 14. A similar signal, E-RIGHT, is generated from the output of the comparison optical device 26 located on the opposite side of substrate 14 utilizing the circuitry shown in FIG. 13C (the circuit shown in FIG. 13C is less complex than that shown in FIGS. 13A and 13B because it does not include elements required to produce the write head firing signal). The two signals, E-LEFT and E-RIGHT, are then provided to a conventional phase sensitive detector, which based on the phase difference between signals E-LEFT and E-RIGHT, generates a correction signal that is applied to a servo motor to appropriately adjust the associated write head 16 on which is mounted sensor assembly 28. This movement of write head 16 also moves one of the comparison optical devices 26 which removes the skew error.

As shown in FIGS. 1 and 1A, solid lateral tracking lines 24 are formed on each side of substrate 14 adjacent timing marks 22. In the illustrated embodiment, tracking lines 24 are shown inside timing marks 22, but they could be located outside timing marks 22 as a matter of choice. Solid tracking lines 24 are used in the conventional manner to maintain the correct lateral position of write heads 16. As best shown in FIG. 2A, a lateral detector 42 comprising split sensors 42a and 42b detects light reflected from substrate 14 and lateral tracking lines 24 as illuminated by LEDs 42c to monitor the position of solid tracking lines 24 to maintain write heads 16 centered with respect to the previously printed image. In the preferred embodiment, balanced detectors which are insensitive to paper optical density variations are used. A lens 42d is used to image substrate 14 in a 1:1 magnification configuration.

FIG. 14A shows circuitry which amplifies the outputs of two split sensors 42a, 42b on one side of substrate 14 and takes their difference to arrive at a signal, A-B LEFT, which is representative of the position of solid tracking line 24 on that side of substrate 14 with respect to lateral detector 42. A corresponding signal, A-B RIGHT, is generated by lateral detector 42 located on the opposite side of substrate 14. Referring to FIG. 14C, the two signals A-B LEFT and A-B RIGHT are then processed to generate two signals, RAS ABS ERR and RAS RAW DIR, which are, respectively, representative of the value and the direction of the correction required, and are utilized to drive a raster correction servo motor to keep the associated write head 16 centered with respect to the previously printed image.

Referring back to FIG. 1, the solid tracking line 24 on each side of substrate 14 includes at least one Start-of-Plot mark 124 for each individual image plot that is printed. The Start-of-Plot mark 124 works in conjunction with the split sensors 42a and 42b. When line 24 passes over sensor assembly 28, part of which consists of lateral detector 42, the tracking line 24 is imaged into sensors 42a and 42b such that the solid line is imaged half on sensor 42a and half on sensor 42b. Sensors 42a and 42b are mounted optically close together and, in the preferred embodiment, form what is known in the art as a split detector, that is, two detectors formed by photolithography on the same substrate. A product such as Silicon Detector Corporation SD 113-24-21-021 will provide a device with two detectors that are each "0.1" long by 0.050" wide and separated by, 0.004". The imaging system should be considered such that the width of the line 24 is somewhat less than the distance across both the sensors 42a and 42b. In the case of SD113-21-21-021, the distance across both detectors is 0.1"; the width of line 24 in the preferred embodiment is 0.06".

In the preferred embodiment, the magnification of the imaging system is 1.0 and is provided by lens 42d which has a focal length of 8 mm and is placed 16 mm from the substrate 14 and 16 mm from detectors 42a and 42b. This allows 0.020" extra detector width on each side of line 24 to allow for system dynamic range. The Start-of-Plot mark 124 is defined as a section of line 24 where, for a space interval equal to at least the length of sensor 42a or 42b, nominally one-half of one side of the line 24 ceases to be printed and then, for a space interval equal to at least the length of sensor 42a or 42b, the side of the line that ceased to be printed returns, coincident with a cession of printing of the other half of line 24.

In the preferred embodiment, Start-of-Plot mark 124 is formed by having the entire line 24 move first one-half its width to one side and then a distance equal to its entire width to the opposite side, and then back again to the center. At the end of this space interval, the entire width of the line 24 returns to its normal configuration and remains constant until the next Start-of-Plot mark 124 occurs. Other variations on this theme are possible. In general, a variation is reflected light effecting split sensors 42a and 42b differentially and then reversing is the method used.

Start-of-Plot marks 124 on opposite sides of substrate 14 present mirror images of each other. That is, when SOP mark 124 on one side of substrate 14 moves towards the edge of substrate 14 nearest it, its corresponding SOP mark on the other side of substrate 14 also moves toward its respective edge; similarly, when SOP mark 124 on one side of substrate 14 moves toward the center of substrate 14 its corresponding SOP mark 124 on the other side also moves toward the center. The mirror image SOP mark configuration allows the raster correction server motor to remain enabled during Start-of-Plot since the variation in the two tracking line 24 from which the lateral correction signal is taken effectively cancel each other for purposes of raster correction.

The effect of passage of the Start-of-Plot mark 124 over split sensors 42a and 42b is that alternately one and then the other sensor 42a, 42b "sees" a much higher light level resulting from an increase in the percent of unprinted pattern being imaged on it. This causes a signal 224 to be generated as shown in FIG. 12A. As the image of Start-of-Plot mark 124 starts to pass over sensors 42a and 42b, the outputs of the two detectors becomes unbalanced and give rise to signal 224a. When the image of Start-of-Plot is positioned so that the image of Start-of-Plot mark 124 is at a position 226 in FIG. 12, signal 224 is at its maximum unbalanced positive voltage 226 because sensor 42a is essentially totally masked by line 24 while sensor 42b "sees" no line. As the image further moves to position 227, signal 224 switches to its maximum unbalanced negative voltage 227 because sensor 42a "sees" no line while sensor 42b is totally masked. In moving from position 226 to position 227, signal 224 passes rapidly through zero voltage 260 where the image of Start-of-Plot mark 124 produces equal signals out from sensors 42a and 42b. As the image further moves to position 228, the sensors 42a and 42b again return to a balanced condition. This signal pattern serves to generate a unique indication of Start-of-Plot at the zero crossing 260.

As shown in FIG. 12A, while the Start-of-Plot signal is unique and well defined, the zero crossover 260 will have noise on it which comes from both electrical noise as well as noise caused by printing errors such as flares or dropouts. As such, this signal is not sufficient to clearly identify a particular print line. It is, however, well defined with respect to one timing mark interval such as those designated 301, 302, 303, etc. in FIG. 12A. The noise band 260 of Start-of-Plot signal 224 can be placed in a unique timing mark interval such as 302 either by physically adjusting the sensor assembly 28 or by electrically delaying the zero crossing. Since, as described in detail above, the timing mark signal 300 is phase locked to the write head firing signal 280, either through a phase lock loop or through a quadrature multiplication circuit, the zero crossover 260 that uniquely determines a timing mark interval can also uniquely determine a particular print line. This is accomplished through use of appropriate conventional circuitry of the type shown in FIG. 15.

As shown in FIG. 1A, a series of Start-of-Plot marks 124 is used to prepare the printer 10 for plotting. This is accomplished by comparing the time interval between the Start-of-Plot transition on opposite sides of the substrate 14. The time difference between the two signals is indicative of an initial gross skew error present between the previously printed pattern and the write head associated with the sensor detecting the Start-of-Plot transitions. The time difference, either positive or negative, is used to drive the skew servo to correct for the skew error. Once the gross error has been corrected, other circuitry is called upon to maintain proper fine skew based upon the phase of left and right timing mark signals, as described above.

Figure 14B:
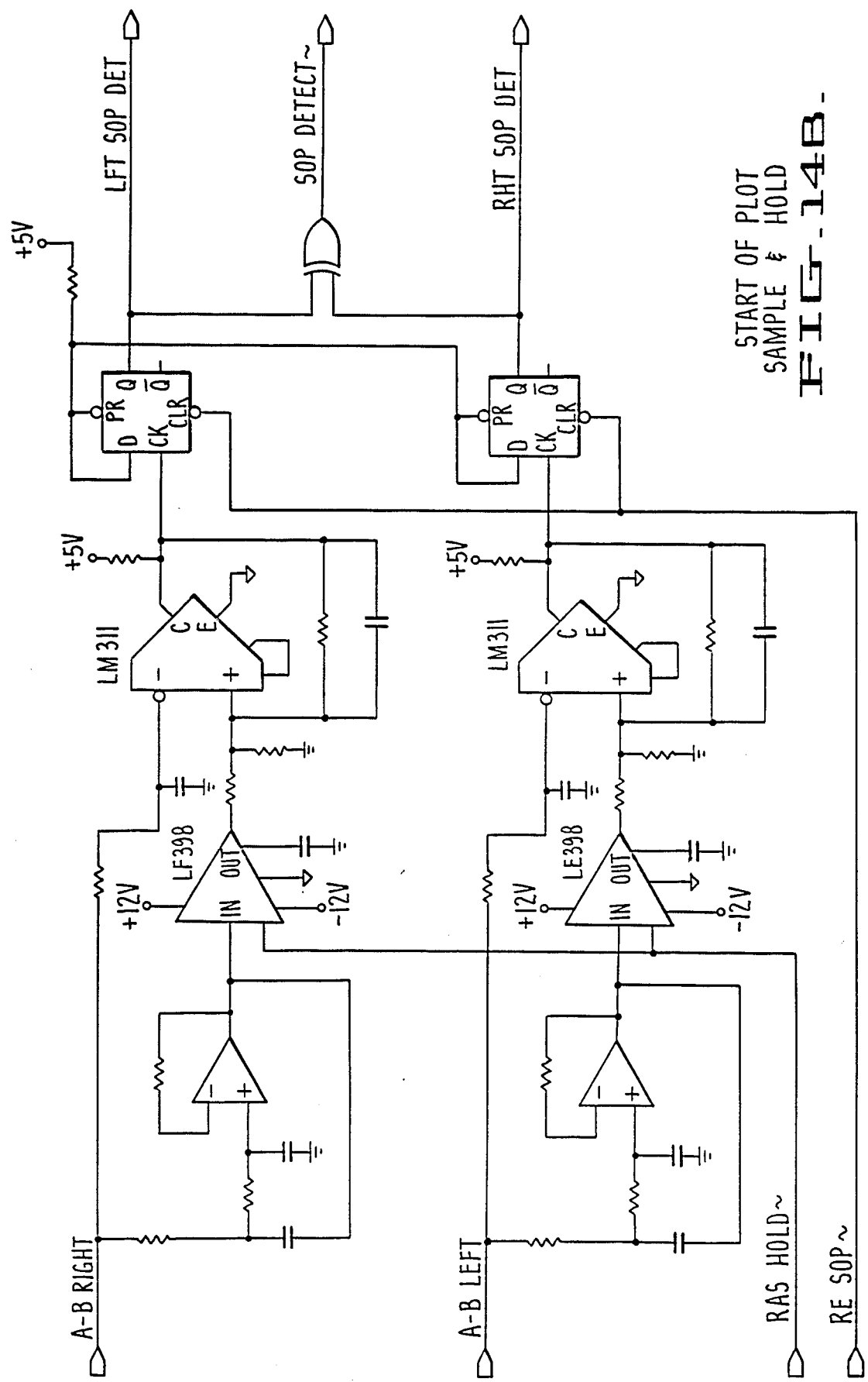

The circuitry for generating the Start-of-Plot signal is shown in FIGS. 14A, 14B and 14D. The two signals A-B RIGHT and A-B LEFT which are generated as described above with respect to FIG. 14A are provided to the circuitry shown in FIG. 14B. Each signal is filtered and stored in a sample-and-hold circuit. These stored A-B levels are used as a reference against the current rapidly-varying A-B signal that is the SOP transition. The stored valve allows correction for variation in the difference between the distance between the two tracking lines 24 and the distance between the two lateral detectors 42. A SOP-DETECT signal is then provided to the processor associated with printer 10.

The Start-of-Plot signal may not be accurate enough to be repeatable to one line. However, as shown in FIG. 12A, since the timing marks 22 are printed in an effective "two-on, two-off" configuration, if the Start-of-Plot signal makes its transition within a window composed of four printed lines, then the logic circuitry associated with the write head 16 signal processing electronics will know that the last line of that four-line window is the first line of the plot.

As stated above, the signal used to generate the line print enable pulse for the first, non-registered print station is derived from encoder 25.

When printer 10 is in the idle mode and a plot request is received, printer 10 generates a set or series of "Start-of-Plot" marks. This allows the write heads to align themselves before a plot begins. When the split detector associated with a particular write head encounters the "Start-of-Plot" set, the zero transition is detected on each side of substrate 14 to correct for gross skew error. The time difference between the two zero crossings indicates the amount of skew error. Multiple sets of "Start-of-Plot" marks 124 proceeding the actual plot, allow more than one attempt at producing correct skew. If the printer 10 is plotting and a new plot request is received, the plot will have a single pair of Start-of- Plot marks 124 generated since the printer 10 should already be properly skew adjusted.

It should be understood that various alternatives to the structures described herein may be employed in practicing the present invention. It is intended that the following claims define the invention, and that the structure within the scope of these claims and their equivalents be covered thereby.

What is claimed is:

1. A system for activating an operating element with respect to a moving substrate, the system comprising:
   a continuous tracking line formed on the substrate and having activation means formed therein which activation means reflects light of an intensity distinguishable from the intensity of light reflected from the remainder of the tracking line;
   a photosensor mounted in relation to the continuous tracking line to sense the intensity of light reflected from the tracking line when the substrate is moving such that the photosensor generates an output signal indicative of the passage of the activation means with respect to the photosensor; and
   means responsive to the output signal to activate the operating element.

2. A system for activating an operating element with respect to a moving substrate, the system comprising:
   a continuous tracking line formed on the substrate and having an activation mark formed therein, the activation mark comprising a section of the tracking line wherein for a first interval of the section a portion of one side of the tracking line ceases to be formed and then for a second interval of the section the formation of the one side returns coincident with the cessation of formation of a portion of the other side of the tracking line for the remainder of the section;
   a sensor block mounted to detect the intensity of light reflected by the tracking line when the substrate is moving and comprising first and second photosensors, the first photosensor mounted such that the intensity of light reflected from the one side of the tracking line is detected by the first photosensor, the second photosensor mounted such that the intensity of light reflected from the other side of the tracking line is detected by the second photosensor, whereby the sensor block generates an output signal indicative of the passage of the interface between the first interval and the second interval with respect to the sensor block; and
   means responsive to the output signal to activate the operating element.

3. A system as in claim 2 wherein the means responsive to the output signal is a write head of an electrostatic printer.

4. A system as in claim 2 wherein the tracking line is nominally imaged half on the first photo-sensor and half on the second photosensor.

5. A system as in claim 2 wherein for the first interval one-half of the width of the tracking line ceases to be formed and for the second interval the other half of the width of the tracking line ceases to be formed.

6. A system as in claim 2 wherein for the first interval the entire tracking line moves one-half its width from its nominal position to one side and for the second interval the entire tracking line moves one-half its width from its nominal position to the other side.

7. A printing device which includes a registration system for maintaining accurate correspondence between an image on a moving substrate and the action of an operating element with respect to the image wherein the registration system includes a series of spaced-apart timing marks formed on the substrate, a comparison optical device mounted in optical relationship to the timing marks such that light is reflected from the substrate through the comparison optical device, and photosensitive means mounted to sense the intensity of light passing through the comparison optical device and to generate a firing signal corresponding thereto, the firing signal being provided to the operating element in correspondence to the passage of the timing marks, an activation system for activating the operating element comprising a continuous tracking line formed on the substrate and having an activation mark formed therein which mark reflects light of an intensity distinguishable from the intensity of light reflected from the remainder of the tracking line, a photosensor mounted in relation to the tracking line to sense the intensity of light reflected from the tracking line when the substrate is moving such that the photosensor generates an output signal indicative of the passage of the activation mark with respect to the photsensor, and means responsive to the output signal to activate the operating element in correspondence to the passage of a selected timing mark wherein the timing marks have a known relationship to the activation mark.

8. A printing device of the type which produces a composite image on a moving substrate and including a system for correcting skew between a previously printed image and a print write head, the system comprising:
   a first continuous tracking line formed on the substrate and having a first activation mark formed therein which first mark reflects light of an intensity distinguishable from the intensity of light reflected from the remainder of the first tracking line;
   a second continuous tracking line formed on the substrate in spaced-apart relation to the first tracking line and having a second activation mark formed therein which second mark reflects light of an intensity distinguishable from the intensity of light reflected from the remainder of the second tracking line;
   photosensor means mounted to sense the intensity of light reflected from the first and second tracking lines when the substrate is moving such that the photosensor means generates first and second signals indicative of the passage of the first and second activation marks, respectively, with respect to the photosensor means;
   means for determining the time difference between the generation of the first signal and the generation of the second signal and for generating a third signal indicative of the time difference;
   means responsive to the third signal for correcting the skew.

9. A skew correction system as in claim 8 wherein the photosensor means comprises a first photosensor for generating the first signal and a second photosensor for generating the second signal.

10. A skew correction system as in claim 9 wherein the first and second photosensors are split detectors which generate differential signals.

11. A skew correction system as in claim 10 wherein the first and second activation marks are mirrar images of each other.

12. A skew correction system as in claim 11 wherein the first activation mark comprises a section of the first tracking line wherein for a first interval of the section a portion of one side of the first tracking line ceases to be formed and then for a second interval of the section the formation of the one side returns coincident with the cessation of formation of a portion of the other side of the first tracking line for the remainder of the section.

13. A skew correction system as in claim 11 wherein the first activation mark comprises a sequence of sections of the first tracking line wherein, for each section, for a first interval of the section a portion of one side of the first tracking line ceases to be formed and then for a second interval of the section the formation of the one side returns coincident with the cessation of formation of a portion of the other side of the first tracking line for the remainder of the section.

* * * * *